(12) United States Patent
Deguchi et al.

(10) Patent No.: US 8,067,120 B2
(45) Date of Patent: Nov. 29, 2011

(54) NON-AQUEOUS ELECTROLYTE SECONDARY BATTERY

(75) Inventors: Masaki Deguchi, Hyogo (JP); Tooru Matsui, Osaka (JP); Hiroshi Yoshizawa, Osaka (JP)

(73) Assignee: Panasonic Corporation, Osaka (JP)

(*) Notice: Subject to any disclaimer, the term of this patent is extended or adjusted under 35 U.S.C. 154(b) by 93 days.

(21) Appl. No.: 11/689,817

(22) Filed: Mar. 22, 2007

(65) Prior Publication Data

US 2007/0224516 A1    Sep. 27, 2007

(30) Foreign Application Priority Data

Mar. 24, 2006 (JP) ................................ 2006-083297

(51) Int. Cl.
 *H01M 6/16* (2006.01)
(52) U.S. Cl. ........................................ 429/327; 429/340
(58) Field of Classification Search ............... 429/231.9, 429/231.1, 231.8, 231.95, 331, 332, 338, 429/326, 327, 340
See application file for complete search history.

(56) References Cited

U.S. PATENT DOCUMENTS

| | | | | |
|---|---|---|---|---|
| 5,427,872 | A * | 6/1995 | Shen et al. | 429/142 |
| 6,180,282 | B1 * | 1/2001 | Nishida et al. | 429/137 |
| 6,432,586 | B1 * | 8/2002 | Zhang | 429/251 |
| 6,447,958 | B1 | 9/2002 | Shinohara | |
| 6,475,679 | B1 * | 11/2002 | Tsutiya et al. | 429/339 |
| 6,627,346 | B1 | 9/2003 | Kinouchi | |
| 6,696,202 | B2 | 2/2004 | Arai | |
| 2003/0124429 | A1 | 7/2003 | Okada | |
| 2004/0038133 | A1 * | 2/2004 | Yamaguchi et al. | 429/326 |
| 2004/0229128 | A1 | 11/2004 | Noh | |
| 2005/0164087 | A1 | 7/2005 | Fujita | |
| 2005/0221172 | A1 * | 10/2005 | Kato et al. | 429/144 |
| 2006/0003232 | A1 * | 1/2006 | Jung et al. | 429/330 |
| 2006/0078801 | A1 * | 4/2006 | Yamaguchi et al. | 429/326 |
| 2006/0222957 | A1 | 10/2006 | Hara | |
| 2007/0111104 | A1 | 5/2007 | Shibuya | |

FOREIGN PATENT DOCUMENTS

| | | |
|---|---|---|
| CN | 1298209 | 6/2001 |
| JP | 348083 | 3/1991 |
| JP | 04026075 | 1/1992 |
| JP | 05205721 | 8/1993 |
| JP | 05258741 | 10/1993 |
| JP | 08241732 | 9/1996 |
| JP | 2001-43899 | 2/2001 |
| JP | 2005340223 | 12/2005 |
| KR | 10-2004-098164 | 11/2004 |
| KR | 10-2006-0106887 | 10/2006 |
| KR | 10-2007-0051706 | 5/2007 |

OTHER PUBLICATIONS

Chinese Office Action dated Oct. 10, 2008. Korean Notice of Allowance dated Jan. 22, 2008 with an English translation thereof.
Chinese Office Action dated Apr. 3, 2009.
Chinese Office Action dated Jun. 4, 2010.
Chinese Office Action dated Jan. 26, 2011.

* cited by examiner

*Primary Examiner* — Jerry A Lorengo
*Assistant Examiner* — Carlos Barcena
(74) *Attorney, Agent, or Firm* — Dickinson Wright PLLC (57) ABSTRACT

The non-aqueous electrolyte secondary battery of the present invention includes a positive electrode containing a lithium-containing transition metal oxide as a positive electrode active material, a negative electrode, a separator interposed between the positive electrode and the negative electrode and a non-aqueous electrolyte. The non-aqueous electrolyte includes a non-aqueous solvent and a solute dissolved therein, and the non-aqueous solvent includes a solvent having an electron-withdrawing substituent. The solvent having an electron-withdrawing substituent includes at least one selected from the group consisting of a sulfonic solvent, a nitrile solvent, a ketonic solvent, a fluorine-containing solvent, a chlorine-containing solvent and a carboxylic acid ester solvent. The separator includes a material containing an electron-withdrawing substituent or an atom having an unshared electron pair.

4 Claims, 1 Drawing Sheet

FIG. 1

NON-AQUEOUS ELECTROLYTE SECONDARY BATTERY

FIELD OF THE INVENTION

The present invention relates to a non-aqueous electrolyte secondary battery, and specifically, to an improvement of a non-aqueous electrolyte and a separator.

BACKGROUND OF THE INVENTION

Currently, in the field of non-aqueous electrolyte secondary batteries, studies on the lithium ion secondary batteries having a high voltage and a high energy density are being actively developed. In typical lithium ion secondary batteries, lithium-containing transition metal oxides such as $LiCoO_2$ are used as the positive electrode active materials, carbon materials are used as the negative electrode active materials, and porous films made of polyethylene or polypropylene are used as the separators. A non-aqueous electrolyte generally includes a non-aqueous solvent and a solute dissolved therein. As the non-aqueous solvent, for example, a cyclic carbonic acid ester, a chain carbonic acid ester, a cyclic carboxylic acid ester and the like are used; as the solute, for example, lithium hexafluorophosphate ($LiPF_6$), lithium tetrafluoroborate ($LiBF_4$) and the like are used.

For the purpose of improving the battery performances, the improvement of the positive electrode active material, negative electrode active material, separator and non-aqueous electrolyte has hitherto been attempted. As for the separator, for example, the following improvements have been developed.

Japanese Patent No. 3048083 (Document 1) has proposed that there is used as a separator a film laminate formed of a porous fluorocarbon resin film including polytetrafluoroethylene (PTFE) and the like and a polyethylene film or a polypropylene film; by laminating a fluorocarbon resin film having a high melting point on a polyethylene film or a polypropylene film, the melting of the separator at the time of abnormal heat generation can be prevented. Consequently, the safety of the battery in short-circuiting or abnormal use can be improved.

Japanese Laid-Open Patent Publication No. 5-258741 (Document 2) has proposed that a separator composed of two layers different in pore size from each other is used for the purpose of improving the safety of the batteries using lithium metal as the negative electrode active material. The layer smaller in pore size suppresses the dendritic growth of lithium metal, and consequently the internal short circuit at the time of charge/discharge and the burning concomitant therewith can be suppressed. It is to be noted that Document 2 discloses a separator formed by laminating a polytetrafluoroethylene film and a film smaller in pore size made of polypropylene.

As for the non-aqueous electrolyte, the following improvements, for example, have been developed.

Japanese Patent No. 3396990 (Document 3) has proposed the use of a non-aqueous solvent including a mixture composed of thiophene dioxide and an acyclic sulfone. Thiophene dioxide forms a protective coating on the negative electrode carbon, and the damage of the negative electrode carbon concomitant with the charge/discharge cycle is thereby suppressed. The addition of the acyclic sulfone decreases the viscosity of the non-aqueous electrolyte, and the ionic conductivity of the non-aqueous electrolyte is thereby improved. Thus, the battery cycle properties can be improved.

Japanese Patent No. 3239267 (Document 4) has proposed that a mixture composed of a cyclic carbonic acid ester and acetonitrile is used as a non-aqueous solvent. Acetonitrile decreases the viscosity of the non-aqueous electrolyte, and the ion conductivity of the non-aqueous electrolyte is thereby improved. Further, acetonitrile is highly resistant to oxidation, so that the deterioration of the non-aqueous electrolyte can be suppressed even when a positive electrode active material having a high electric potential is used. Thus, the high-rate discharge characteristics and the cycle characteristics of the battery can be improved.

Japanese Laid-Open Patent Publication No. 2005-340223 (Document 5) has proposed that a nonflammable fluorine-containing ether is used as a non-aqueous solvent for the purpose of improving the battery safety.

It has been known that the lithium-containing transition metal oxide as the positive electrode active material undergoes an intensive elution of the metals constituting the metal oxide when the battery is stored at high voltages and at high temperatures. In this connection, even when there is used a separator as proposed in above Documents 1 and 2 formed by laminating a polyethylene film or a polypropylene film and a polytetrafluoroethylene film, the elution of the metal atoms from the lithium-containing transition metal oxide cannot be suppressed. Consequently, the metal atoms eluted from the lithium-containing transition metal oxide are deposited on the negative electrode to cause the impedance increase of the negative electrode, the clogging of the separator and others. Thus, a battery containing a lithium-containing transition metal oxide as the positive electrode active material undergoes a degradation of the rate characteristics after storage.

Even when such non-aqueous solvents as proposed in Documents 3 to 5 are used, such above-described elution of the metal atoms from the lithium-containing transition metal oxide cannot be suppressed. Consequently, as described above, the rate characteristics after storage is degraded.

Accordingly, an object of the present invention is to provide a non-aqueous electrolyte secondary battery capable of alleviating the degradation of the rate characteristics when the battery is stored, in particular, at high voltages and at high temperatures.

BRIEF SUMMARY OF THE INVENTION

The non-aqueous electrolyte secondary battery of the present invention includes a positive electrode comprising a lithium-containing transition metal oxide as a positive electrode active material, a negative electrode, a separator interposed between the positive electrode and the negative electrode and a non-aqueous electrolyte. The non-aqueous electrolyte includes a non-aqueous solvent and a solute dissolved therein, and the non-aqueous solvent includes a solvent having an electron-withdrawing substituent. The solvent having an electron-withdrawing substituent includes at least one selected from the group consisting of a sulfonic solvent, a nitrile solvent, a ketonic solvent, a fluorine-containing solvent, a chlorine-containing solvent and a carboxylic acid ester solvent. The separator includes a material containing an electron-withdrawing substituent or an atom having an unshared electron pair.

The above-mentioned solvent having an electron-withdrawing substituent more preferably includes at least one selected from the group consisting of a sulfonic solvent, a nitrile solvent and a fluorine-containing solvent. The fluorine-containing solvent preferably includes at least one selected from the group consisting of a fluorine-containing ether, a fluorine-containing carbonic acid ester and a fluorine-containing carboxylic acid ester, and is particularly preferably a fluorine-containing ether. The chlorine-containing solvent preferably includes at least one selected from the group consisting of a chlorine-containing ether, a chlorine-containing carbonic acid ester and a chlorine-containing carboxylic acid ester.

The solvent having an electron-withdrawing substituent more preferably includes at least one selected from the group consisting of sulfolane, 3-methylsulfolane, ethyl methyl sulfone, acetonitrile, propionitrile, butyronitrile, 1,1,2,2-tetrafluoroethyl-2,2,3,3-tetrafluoropropyl ether, and 2,2,3,3-tetrafluoropropyl difluoromethyl ether.

The material containing an electron-withdrawing substituent or an atom having an unshared electron pair preferably includes a fluorine atom. Additionally, the above-mentioned material is preferably polytetrafluoroethylene.

The separator preferably further includes an inorganic filler.

The separator is preferably in contact with the positive electrode, wherein more preferably a reduction-resistant film or an insulating layer is interposed between the separator and the negative electrode.

While the novel features of the invention are set forth particularly in the appended claims, the invention, both as to organization and content, will be better understood and appreciated, along with other objects and features thereof, from the following detailed description taken in conjunction with the drawing.

DETAILED DESCRIPTION OF THE INVENTION

Hereinafter, the best mode for implementing the present invention will be described in detail.

The non-aqueous electrolyte secondary battery of the present invention includes a positive electrode, a negative electrode, a separator interposed between the positive electrode and the negative electrode and a non-aqueous electrolyte.

The non-aqueous electrolyte includes a non-aqueous solvent and a solute dissolved therein. The non-aqueous solvent includes at least one first solvent selected from the group consisting of a sulfonic solvent, a nitrile solvent, a ketonic solvent, a fluorine-containing solvent, a chlorine-containing solvent and a carboxylic acid ester solvent.

The separator includes a material containing an electron-withdrawing substituent or an atom having an unshared electron pair.

The positive electrode includes, for example, a positive electrode current collector and a positive electrode active material layer carried thereon. The positive electrode active material layer includes a positive electrode active material, a binder, a conductive agent and the like.

The positive electrode active material includes a lithium-containing transition metal oxide. Examples of the lithium-containing transition metal oxide may include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$ and $Li_xMn_{2-y}M_yO_4$, wherein M represents at least one of Na, Mg, Sc, Y, Mn, Fe, Co, Ni, Cu, Zn, Al, Cr, Pb, Sb and B, x=0 to 1.2, y=0 to 0.9, and z=2.0 to 2.3. The above x value representing the molar ratio of lithium means the value immediately after the preparation of the active material; the x value is varied through charge/discharge.

The negative electrode includes, for example, a negative electrode current collector and a negative electrode active material layer carried thereon. The negative electrode active material layer includes a negative electrode active material, a binder, and, if necessary, a conductive agent and the like.

Examples of the materials usable in the negative electrode active material may include: graphites such as natural graphite (such as flake graphite) and an artificial graphite; carbon blacks such as acetylene black, Ketjen black, channel black, furnace black, lamp black and thermal black; carbon fibers, metal fibers, alloys, lithium metal, tin compounds, silicides and nitrides.

Examples of the binders to be used for the positive and negative electrodes may include polyethylene, polypropylene, polytetrafluoroethylene, polyvinylidene fluoride, tetrafluoroethylene-hexafluoropropylene copolymer, and vinylidene fluoride-hexafluoropropylene copolymer.

Examples of the conductive agents contained in the electrodes may include: graphites; carbon blacks such as acetylene black, Ketjen black, channel black, furnace black, lamp black and thermal black; carbon fibers; and metal fibers.

Examples of the materials to be used for the positive electrode current collector may include sheet foils made of stainless steel, aluminum or titanium. Examples of the materials to be used for the negative electrode current collector may include sheet foils made of stainless steel, nickel or copper. No particular constraint is imposed on the thickness of these sheet foils; the thickness of each of such sheet foils is generally 1 to 500 µm.

The non-aqueous solvent contained in the non-aqueous electrolyte includes, as described above, at least one first solvent selected from the group consisting of a sulfonic solvent, a nitrile solvent, a ketonic solvent, a fluorine-containing solvent, a chlorine-containing solvent and a carboxylic acid ester solvent. These first solvents have an electron-withdrawing functional group such as —F, —Cl, —CN, —SO$_2$—, —CO—, —COO— and —CF$_3$. It is to be noted that the fluorine-containing solvent is preferably at least one selected from the group consisting of a fluorine-containing ether, a fluorine-containing carbonic acid ester and a fluorine-containing carboxylic acid ester. The chlorine-containing solvent is preferably at least one selected from the group consisting of a chlorine-containing ether, a chlorine-containing carbonic acid ester and a chlorine-containing carboxylic acid ester.

The separator includes a material containing an electron-withdrawing substituent or an atom having an unshared electron pair. Examples of the electron-withdrawing substituent may include —F, —Cl, —CN, —SO$_2$—, —CO—, —COO— and —CF$_3$. Examples of the atom having an unshared electron pair may include —N<, —O—, —F and —S—.

In the above described material, the electron-withdrawing substituent or the atom having an unshared electron pair is in a state high in electron density. In other words, in the above-mentioned material, a dipole moment is generated. Also in the first solvent having an electron-withdrawing substituent, the charge is polarized in each of the molecules of the solvent to generate a portion high and a portion low in electron density, giving rise to a dipole moment. Thus, the dipole moment of the material constituting the separator and the dipole moment of the first solvent interact with each other; in other words, the electron-withdrawing substituents or the atoms having an unshared electron pair contained in the separator material and the atoms low in electron density (i.e., atoms next to the electron-withdrawing substituents) in the first solvent molecules interact with each other, and consequently the first solvent molecules are attracted to the separator surface to be adsorbed thereon.

At the time of storage, in particular, storage at high voltages and at high temperatures, the metal atoms constituting the positive electrode active material are eluted from the positive electrode active material such as a lithium-containing transition metal oxide into the non-aqueous electrolyte, such eluted atoms staying as metal cations in the non-aqueous electrolyte; the metal cations are low in electron density.

The first solvent adsorbed on the separator has an electron-withdrawing substituent, the electron density of this substituent being high. The first solvent molecules (namely, the electron-withdrawing substituents) adsorbed on the separator surround the metal cations eluted from the positive electrode active material to trap the metal cations. In other words, the metal cations eluted from the positive electrode are trapped by the separator in such a condition that the metal cations are solvated. Accordingly, even when a battery is stored at high voltages and at high temperatures, the deposition of the metal cations on the negative electrode is suppressed, and the degradation of the rate characteristics can thereby be alleviated.

It is to be noted that in each of above Documents 1 and 2, polytetrafluoroethylene containing electron-withdrawing fluorine atoms (fluorine substituents) in the composition thereof is used as the material constituting the separator. However, even if the separator composed exclusively of polytetrafluoroethylene is used, the separator cannot trap the metal cations when the non-aqueous solvent does not have such an electron-withdrawing substituent as described above. Consequently, at the time of storage, the metal cations eluted from the positive electrode are deposited on the negative electrode, and the rate characteristics after storage is thereby degraded.

Additionally, even when there are used as the non-aqueous solvents the solvents proposed in above Documents 3 to 5, namely, sulfonic solvents such as thiophene dioxide and an acyclic sulfone, nitrile solvents such as acetonitrile, and fluorine-containing solvents such as a fluorine-containing ether, the separator cannot trap the metal cations without using the separator including a material containing an electron-withdrawing substituent or an atom having an unshared electron pair. Thus, also in this case, the rate characteristics after storage is degraded.

Examples of the sulfonic solvent may include sulfolane, 3-methylsulfolane and ethyl methyl sulfone.

Examples of the nitrile solvent may include acetonitrile, propionitrile and butyronitrile.

The carboxylic acid ester solvent may be either a chain compound or a cyclic compound as long as it contains a carboxyl group. Examples of the carboxylic acid ester solvent may include methyl acetate, methyl propionate, γ-butyrolactone and γ-valerolactone.

Examples of the ketonic solvent may include dimethyl ketone, ethyl methyl ketone and cyclohexyl ketone.

Examples of the fluorine-containing ether solvent may include 1,1,2,2-tetrafluoroethyl-2,2,3,3-tetrafluoropropyl ether and 2,2,3,3-tetrafluoropropyl difluoromethyl ether.

Examples of the fluorine-containing carboxylic acid ester may include methyl difluoroacetate and ethyl difluoroacetate.

Examples of the fluorine-containing carbonic acid ester may include ethyl-2,2,2-trifluoroethyl carbonate and di-(2,2,2-trifluoroethyl)carbonate.

Examples of the chlorine-containing solvent may include 2-chloroethyl methyl ether, 2-chloroethyl ethyl ether, 1-chloroethyl dichloromethyl ether, methyl dichloroacetate, ethyl dichloroacetate, ethyl-2,2-2-trichloroethyl carbonate, and di-(2,2,2-trichloroethyl) carbonate.

Preferred among these first solvents are sulfonic solvents each containing —$SO_2$— in the composition thereof, nitrile solvents each containing —CN in the composition thereof, and fluorine-containing solvents each containing —F (or —$CF_3$) in the composition thereof. These substituents are particularly high in electron withdrawing property, and hence the charge polarization in the solvent molecules becomes large to increase the amount of the solvent molecules adsorbed on the separator. Consequently, the metal cations are further easily trapped.

Preferred among the fluorine-containing solvents are fluorine-containing ether solvents. This is because the electron density on the O atom in the ether bond is high, and hence the O atom in the ether bond as well as the F atom in the solvent molecule has a function to trap the metal cations eluted from the positive electrode.

The first solvent preferably includes, among the above-mentioned solvents, at least one selected from the group consisting of sulfolane, 3-methylsulfolane, ethyl methyl sulfone, acetonitrile, propionitrile, butyronitrile, 1,1,2,2-tetrafluoroethyl-2,2,3,3-tetrafluoropropyl ether, and 2,2,3,3-tetrafluoropropyl difluoromethyl ether. Additionally, the first solvent more preferably includes at least one selected from the group consisting of sulfolane, 1,1,2,2-tetrafluoroethyl-2,2,3,3-tetrafluoropropyl ether, and 2,2,3,3-tetrafluoropropyl difluoromethyl ether. Further, the first solvent is particularly preferably sulfolane alone, or a mixture composed of sulfolane and 1,1,2,2-tetrafluoroethyl-2,2,3,3-tetrafluoropropyl ether or 2,2,3,3-tetrafluoropropyl difluoromethyl ether.

The amount of the first solvent is preferably 20% by volume or more and more preferably 50% by volume or more of the non-aqueous solvent. When the amount of the first solvent is less than 20% by volume, the number of the first solvent molecules adsorbed on the separator becomes small, and hence sometimes the metal cations eluted from the positive electrode active material cannot be sufficiently trapped in the structure formed by the electron-withdrawing substituents of the adsorbed first solvent molecules. It is to be noted that the non-aqueous solvent may be composed exclusively of the first solvent.

The non-aqueous electrolyte may include a second solvent other than the first solvent. As the second solvent, for example, a cyclic carbonic acid ester and a chain carbonic acid ester may be used. Examples of the cyclic carbonic acid ester may include propylene carbonate and ethylene carbonate. Examples of the chain carbonic acid ester may include diethyl carbonate, ethyl methyl carbonate and dimethyl carbonate. The amount of the second solvent is preferably 80% by volume or less and more preferably 50% by volume or less of the non-aqueous solvent. It is to be noted that the non-aqueous solvent may not include the second solvent.

No particular constraint is imposed on the solute to be dissolved in the non-aqueous solvent. Examples of the solute may include: $LiPF_6$, $LiClO_4$, $LiBF_4$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, lower aliphatic carboxylic acid salts of lithium, LiCl, LiBr, LiI, chloroborane lithium; borates such as lithium bis(1,2-benzenedioleate(2-)-O,O')borate, lithium bis(2,3-naphthalenedioleate(2-)-O,O')borate, lithium bis(2,2'-biphenyldioleate(2-)-O,O')borate, and lithium bis(5-fluoro-2-oleate-1-benzenesulfonic acid-O,O')borate; and imide salts such as lithium bis(trifluoromethanesulfonyl)imide (($CF_3SO_2)_2$NLi), lithium(trifluoromethanesulfonyl)(nonafluorobutanesulfonyl)imide ($LiN(CF_3SO_2)(C_4F_9SO_2)$), and lithium bis (pentafluoroethanesulfonyl)imide (($C_2F_5SO_2$)$_2$NLi). These solutes may be used each alone or in combinations of two or more thereof.

The non-aqueous electrolyte is preferably made to contain a cyclic carbonic acid ester having at least one carbon-carbon unsaturated bond. Such a cyclic carbonic acid ester is decomposed on the negative electrode to form a coating having a high lithium-ion conductivity. Consequently, the charge/discharge efficiency is enhanced. The amount of the above-mentioned cyclic carbonic acid ester is preferably 0.1% by volume or more and 10% by volume or less of the non-aqueous solvent.

Examples of the cyclic carbonic acid ester having at least one carbon-carbon unsaturated bond may include vinylene carbonate, 3-methylvinylene carbonate, 3,4-dimethylvinylene carbonate, 3-ethlyvinylene carbonate, 3,4-diethylvinylene carbonate, 3-propylvinylene carbonate, 3,4-dipropylvinylene carbonate, 3-phenylvinylene carbonate, 3,4-diphenylvinylene carbonate, vinylethylene carbonate and divinylethylene carbonate. These may be used each alone or in combinations of two or more thereof. Preferred among these is at least one selected from the group consisting of vinylene carbonate, vinylethylene carbonate and divinylethylene carbonate.

Further, the non-aqueous electrolyte may be made to contain a benzene derivative well known in the art to be decomposed at the time of overcharge to form a coating on the electrodes and to thereby deactivate the battery. The benzene derivative preferably has a phenyl group and a cyclic compound group adjacent to the phenyl group. Preferred as the cyclic compound group are, for example, a phenyl group, a cyclic ether group, a cyclic ester group, a cycloalkyl group and a phenoxy group. Specific examples of the benzene derivative may include cyclohexylbenzene, biphenyl and diphenyl ether. These may be used each alone or in combinations of two or more thereof. It is to be noted that the content of the benzene derivative is preferably 10% by volume or less of the non-aqueous solvent.

Examples of the above-mentioned material containing an electron-withdrawing substituent or an atom having an unshared electron pair may include polytetrafluoroethylene, tetrafluoroethylene-perfluoroalkyl vinyl ether copolymer, tetrafluoroethylene-hexafluoropropylene copolymer, tetrafluoroethylene-ethylene copolymer, polyvinylidene fluoride, polychlorotrifluoroethylene, polyamide, polyimide, polyamideimide, polyetherimide, polyarylate, polysulfone, polyethersulfone, polyphenylenesulfide, polyetheretherketone, polyethylene terephthalate, polybutylene terephthalate, polyphenylene ether, polyoxymethylene, polystyrene, acrylonitrile-styrene-acrylate copolymer, and polymers containing acrylonitrile units.

The separator is particularly preferably formed of a material containing a fluorine-containing substituent such as —F or —$CF_3$ in the composition thereof. A fluorine atom is high in electron-withdrawing property, and hence the electron density on the fluorine atom is extremely high. Accordingly, the separator can strongly interact with the atom low in electron density (the atom adjacent to the electron-withdrawing substituent) in each of the first solvent molecules, and can thereby increase the number of the first solvent molecules adsorbed on the separator. Consequently, the number of the sites on the separator, capable of trapping the metal cation, can be increased.

Additionally, when the above-mentioned material contains fluorine atoms, the material is most preferably polytetrafluoroethylene. Polytetrafluoroethylene contains four electron-withdrawing fluorine atoms in each of the repeating units thereof. Consequently, polytetrafluoroethylene can adsorb a larger number of the first solvent molecules to remarkably enhance the metal cation-trapping effect.

The separator may be an insulating layer including a material containing an electron-withdrawing substituent or an atom having an unshared electron pair and an inorganic filler. Such an insulating layer is high in resistance to reduction because it includes the inorganic filler. Accordingly, such reductive decomposition of the separator as will be described below can be prevented. When the separator includes an inorganic filler, the material containing an electron-withdrawing substituent or an atom having an unshared electron pair is preferably a polymer containing acrylonitrile units. The amount of the acrylonitrile units in the polymer is preferably 20 mol % or more. Examples of the acrylonitrile unit-containing polymer may include polyacrylonitrile, polyacrylonitrile-modified rubber and acrylonitrile-styrene-acrylate copolymer.

The use of an acrylonitrile unit-containing polymer as the above-mentioned material can improve the dispersibility between the material and the inorganic filler in the insulating layer, and can thereby improve the metal cation-trapping effect.

The amount of the inorganic filler is preferably 80 to 99% by weight of the insulating layer. When the amount of the inorganic filler is less than 80% by weight, the voids in the interior of the insulating layer are decreased, and the lithium-ion conductivity may be degraded. When the amount of the inorganic filler is larger than 99% by weight, the strength of the insulating layer itself may become low.

Examples of the inorganic filler may include alumina, titania, zirconia, magnesia and silica.

When the separator includes the above-mentioned insulating layer, the separator may be formed exclusively of the insulating layer. Alternatively, the separator may include a porous film formed of a material well known in the art as well as the insulating layer.

The thickness of the separator is preferably 0.5 to 300 μm. This is also applicable to the case where the separator is formed of such an insulating layer as described above.

In the present invention, it is particularly preferable to use a separator including polytetrafluoroethylene or a separator including a material containing an electron-withdrawing substituent or an atom having an unshared electron pair and an inorganic filler in combination with a non-aqueous electrolyte containing sulfolane or a non-aqueous electrolyte containing sulfolane and a fluorine-containing ether.

The separator is preferably in direct contact with the positive electrode but not in direct contact with the negative electrode when the material forming the separator contains an electron-withdrawing functional group.

For example, in the case where the separator is formed of polytetrafluoroethylene, the strong electron-withdrawing property of the fluorine atom induces a low electron density state in each of the carbon atoms forming the polymer skeleton. When the negative electrode potential is largely decreased, the portion, low in electron density, of the polymer skeleton tends to be easily reduced, and accordingly that portion tends to be easily invaded by the electrons from the negative electrode. The portion invaded by the electrons is increased in electron density, and consequently the fluorine atoms do not attract electrons from the adjacent carbon atoms. In other words, the electron density is increased in the whole molecule. Consequently, for example, the polarization of the electrons in the C—F bond is decreased (in other words, the dipole moment is decreased), and hence the first solvent molecules are hardly adsorbed on the separator. Accordingly, the metal cation-trapping effect is conceivably somewhat degraded.

In this case, a reduction-resistant film or such an insulating layer as described above is preferably interposed between the negative electrode and the separator. In this way, it is possible to suppress the electron transfer from the negative electrode to the low-electron-density portion of the separator. Accordingly, it is possible to suppress the degradation of the metal cation-trapping effect of the separator.

Examples of the reduction-resistant film may include polyethylene film or polypropylene film. The thickness of the reduction-resistant film is preferably 0.5 to 50 µm.

When an insulating layer is interposed between the separator and negative electrode, the thickness of the insulating layer is preferably 0.5 to 50 µm. The insulating layer may be formed on the negative electrode surface facing the separator or on the separator surface facing the negative electrode.

Hereinafter, an example of the preparation method of the separator is presented.

A material containing an electron-withdrawing substituent or an atom having an unshared electron pair is mixed with an organic solvent, the material is melted, and the mixture thus obtained is kneaded and then subjected to extrusion molding. Thereafter, the molded body is subjected to stretching, removing of the organic solvent, drying, and heat setting, and consequently a separator can be obtained.

For example, a separator can be obtained according to the following method.

At the beginning, a material containing an electron-withdrawing substituent or an atom having an unshared electron pair and a good solvent for the material are mixed together to prepare a material solution.

The material solution can be prepared, for example, by dissolving under heating the above-mentioned material in a predetermined solvent. It is to be noted that no particular constraint is imposed on the solvent as long as the solvent can sufficiently dissolve the above-mentioned material. Examples of the solvent may include: aliphatic and cyclic hydrocarbons such as nonane, decane, undecane, dodecane and liquid paraffin; and mineral oil distillates having a boiling point comparable to the boiling points of these hydrocarbons. For the purpose of improving the stability of the gelatinous molded matter obtained on completion of the extrusion molding, it is preferable to use a nonvolatile solvent such as liquid paraffin.

The dissolution by heating may be carried out in such a way that the above-mentioned material is dissolved under stirring in a solvent at a temperature to effect complete dissolution, or in such another way that the above-mentioned material is dissolved under homogeneous mixing with the solvent in an extruder. When the above-mentioned material is dissolved in the solvent under stirring, the temperature for the dissolution usually falls within a range from 140 to 250° C.; the temperature is varied depending on types of the above-mentioned material and the solvent.

When the dissolution is carried out in an extruder, the above-mentioned material is first fed into the extruder to be melted. Although the melting temperature varies depending on the type of the above-mentioned material, the melting temperature preferably falls within a range from 30 to 100° C. above the melting point of the material. Thereafter, to the material in the molten state, a predetermined solvent is fed from a predetermined position of the extruder. In this way, a solution containing the molten material can be obtained.

Next, this solution is extruded from the die of the extruder into a sheet, and the sheet is cooled to prepare a gelatinous composition. In this connection, when the solution of the above-mentioned material is prepared in the extruder, the solution may be extruded from the extruder through the die thereof, or the solution may be transferred to another extruder to be extruded therefrom through the die thereof.

Next, the gelatinous composition thus obtained is cooled to form a gelatinous molded matter. The cooling is carried out by cooling the die or by cooling the gelatinous sheet. The cooling is preferably carried out at least until the sheet reaches 90° C. or lower at a rate of 50° C./minute, and more preferably until the sheet reaches 80 to 30° C. Examples of the cooling method of the gelatinous composition may include the following methods: a method in which the composition is brought into direct contact with cool air, cooling water or other cooling media; and a method in which the composition is brought into direct contact with a roll having been cooled with a cooling medium. Preferred among these methods is the method using a cooled roll.

Next, the gelatinous molded matter is subjected to biaxial stretching to prepare a molded matter. The stretching is carried out at a predetermined magnification by heating the gelatinous molded matter and by applying the usual tenter method, roll method or rolling method, or a combination of these methods. The biaxial stretching may adopt either a simultaneous longitudinal and lateral stretching or a successive longitudinal and lateral stretching; particularly preferred is the simultaneous biaxial stretching.

The molded matter thus obtained is cleaned with a cleaning agent to remove the remaining solvent. Examples of the usable cleaning agent may include the following readily volatile solvents: hydrocarbons such as pentane, hexane and heptane; chlorinated hydrocarbons such as methylene chloride and carbon tetrachloride; fluorinated hydrocarbons such as ethane trifluoride; and ethers such as diethyl ether and dioxane. These cleaning agents may be used each alone or in combinations of two or more thereof. It is to be noted that these cleaning agents are appropriately selected according to the solvent used for dissolving the above-mentioned material.

Examples of the cleaning method of the molded matter may include the following methods: a method in which the molded matter is soaked in a predetermined cleaning agent to extract the remaining solvent; a method in which the molded matter is showered with a cleaning agent; and a method in which these methods are combined.

The cleaning of the molded matter is preferably carried out until the content of the remaining solvent in the molded matter becomes less than 1% by weight.

Thereafter, the molded matter is dried to remove the cleaning agent. The drying can be carried out, for example, by means of such methods as heat drying and air drying.

Finally, the molded matter after drying is subjected to heat setting at a temperature of 100° C. or higher, and thus, a separator as a high-strength microporous film can be obtained.

The present invention is described based on Examples in the following.

EXAMPLES

Example 1

(Fabrication of Batteries 1 to 28)
(i) Preparation of Non-Aqueous Electrolytes

In each of the non-aqueous solvents shown in Table 1, $LiPF_6$ was dissolved in a concentration of 1.0 mol/L to prepare the non-aqueous electrolytes 1 to 28. It is to be noted that also in the following examples and comparative examples, the concentration of LiPF$_6$ in each of the non-aqueous electrolytes was set at 1.0 mol/L.

In Table 1, the abbreviations for the used first solvents are as follows:

| | |
|---|---|
| SL: | Sulfolane |
| 3MeSL: | 3-Methylsulfolane |
| EMS: | Ethyl methyl sulfone |
| AN: | Acetonitrile |
| PN: | Propionitrile |
| BN: | Butyronitrile |
| TFETFPE: | 1,1,2,2-Tetrafluoroethyl 2,2,3,3-tetrafluoropropyl ether |
| TFPDFME: | 2,2,3,3-Tetrafluoropropyl difluoromethyl ether |
| MDFA: | Methyl difluoroacetate |
| EDFA: | Ethyl difluoroacetate |
| ETFEC: | Ethyl 2,2,2-trifluoroethyl carbonate |
| DTFEC: | Di-(2,2,2-trifluoroethyl) carbonate |
| MA: | Methyl acetate |
| MP: | Methyl propionate |
| GBL: | γ-Butyrolactone |
| GVL: | γ-Valerolactone |
| DMK: | Dimethyl ketone |
| EMK: | Ethyl methyl ketone |
| CHK: | Cyclohexyl ketone |

The abbreviations for the used second solvents are as follows:

| | |
|---|---|
| EC: | Ethylene carbonate |
| EMC: | Ethyl methyl carbonate |
| DEC: | Diethyl carbonate |

(ii) Separator

There was used a separator formed of polytetrafluoroethylene (PTFE) containing fluorine atoms in the composition thereof. The thickness of the separator was 54 μm, and the porosity thereof was 61%.

(iii) Preparation of the Positive Electrode Plate

The following were mixed: 85 parts by weight of a powder of lithium cobaltate, 10 parts by weight of acetylene black as a conductive agent, and 5 parts by weight of polyvinylidene fluoride resin as a binder. The mixture thus obtained was dispersed in dehydrated N-methyl-2-pyrrolidone to prepare a slurry-like positive electrode material mixture. The obtained positive electrode material mixture was applied to both sides of a positive electrode current collector (thickness: 15 μm) formed of an aluminum foil, dried, and rolled, to obtain a positive electrode plate (thickness: 160 μm).

(iv) Preparation of the Negative Electrode Plate

The following were mixed: 75 parts by weight of an artificial graphite powder, 20 parts by weight of acetylene black as a conductive agent and 5 parts by weight of polyvinylidene fluoride resin as a binder. The mixture thus obtained was dispersed in dehydrated N-methyl-2-pyrrolidone to prepare a slurry-like negative electrode material mixture. The obtained negative electrode material mixture was applied to both sides of a negative electrode current collector (thickness: 10 μm) formed of a copper foil, dried, and rolled, to obtain a negative electrode plate (thickness: 160 μm).

(v) Fabrication of Cylindrical Batteries

Figure 1:
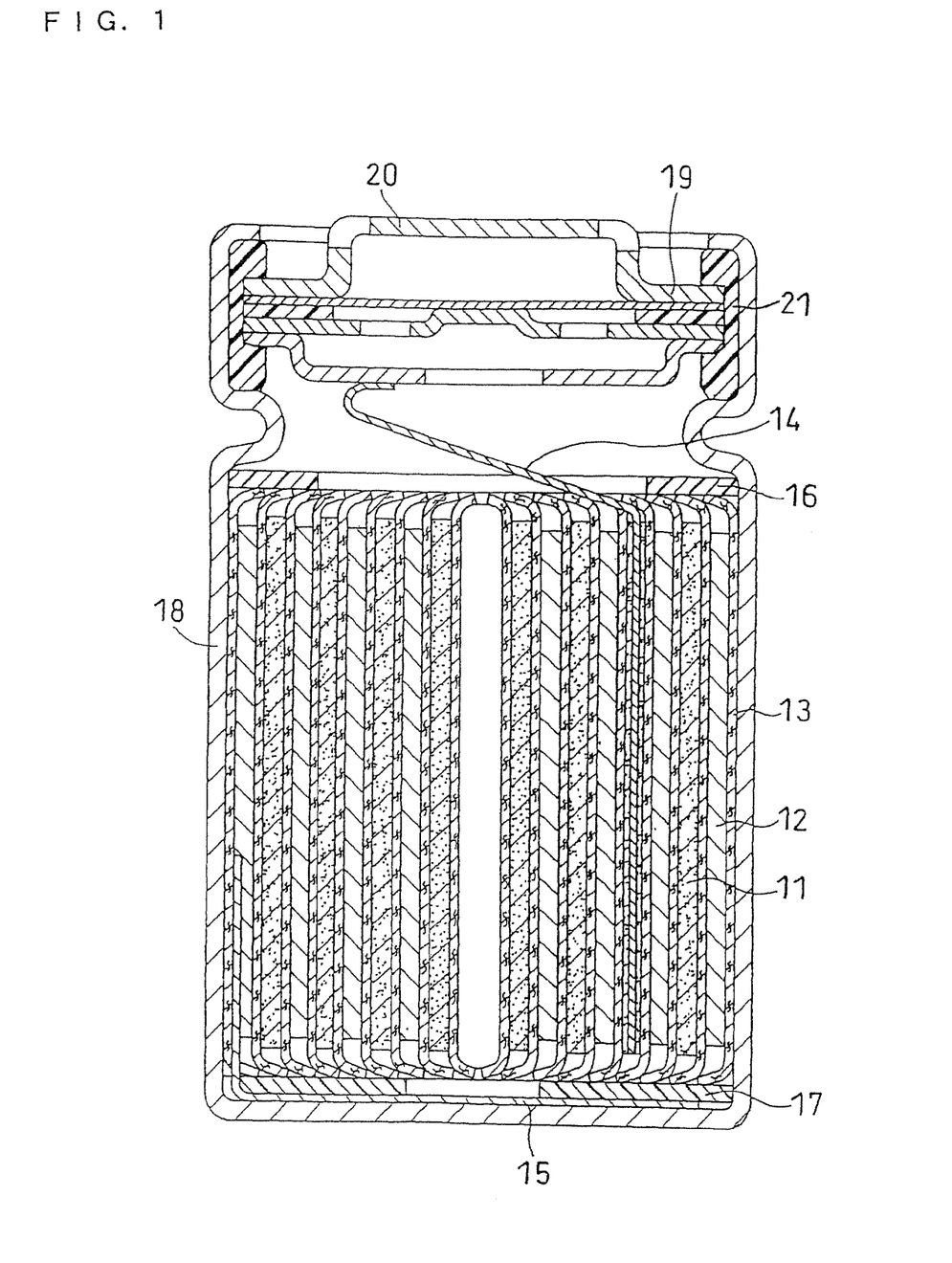
FIG. 1 is a longitudinal sectional view schematically illustrating a cylindrical non-aqueous electrolyte secondary battery fabricated in EXAMPLES.

Each of the cylindrical batteries as shown in FIG. 1 was fabricated.

A battery 1 was obtained as follows. A positive electrode plate 11, a negative electrode plate 12 and a separator 13 interposed between the positive electrode plate 11 and the negative electrode plate 12 were spirally wound around to obtain an electrode plate assembly. The electrode plate assembly was inserted into a nickel-plated iron battery case 18. One end of the positive electrode lead 14 made of aluminum was connected to the positive electrode plate 11, and the other end of the positive electrode lead 14 was connected to the back side of a sealing plate 19 electrically connected to a positive electrode terminal 20. One end of a negative electrode lead 15 made of nickel was connected to the negative electrode plate 12, and the other end of the negative electrode lead 15 was connected to the bottom of the battery case 18. An upper insulating plate 16 was disposed on the top of the electrode plate assembly, and a bottom insulating plate 17 was disposed on the bottom of the electrode plate assembly. A predetermined amount of the non-aqueous electrolyte 1 (not shown in the figure) prepared as described above was injected into the battery case 18. The opening end of the battery case 18 was crimped to the sealing plate 19 with a gasket 21 interposed therebetween to seal the opening of the battery case 18 to complete the battery 1.

Batteries 2 to 28 were obtained in the same manner as for the battery 1 except that the non-aqueous electrolytes 2 to 28 were used in place of the non-aqueous electrolyte 1.

Comparative Example 1

A comparative battery 1 was obtained in the same manner as for the battery 1 except that there was used a non-aqueous electrolyte "a" containing a mixed solvent composed of ethylene carbonate (EC) and ethyl methyl carbonate (EMC) (volume ratio 1:1) and LiPF$_6$ dissolved in the mixed solvent, and there was used a separator formed of polyethylene (PE) (Hipore™ manufactured by Asahi Kasei Chemicals Corporation, thickness 20 μm).

Comparative Example 2

A comparative battery 2 was obtained in the same manner as for the battery 1 except that there was used a non-aqueous electrolyte "b" containing a mixed solvent composed of sulfolane (SL) and ethyl methyl sulfone (EMS) (volume ratio 1:1) and LiPF$_6$ dissolved in the mixed solvent, and there was used a separator formed of polypropylene (PP) (Hipore™ manufactured by Asahi Kasei Chemicals Corporation, thickness 20 μm).

Comparative Example 3

A comparative battery 3 was obtained in the same manner as for the battery 1 except that there was used a non-aqueous electrolyte "c" containing a mixed solvent composed of ethylene carbonate (EC) and acetonitrile (AN) (volume ratio 1:1) and LiPF$_6$ dissolved in the mixed solvent, and there was used a separator formed of polypropylene (PP) (Hipore™ manufactured by Asahi Kasei Chemicals Corporation, thickness 20 μm).

Comparative Example 4

A comparative battery 4 was obtained in the same manner as for the battery 1 except that there was used a non-aqueous electrolyte "d" containing a mixed solvent composed of ethylene carbonate (EC) and 1,1,2,2-tetrafluoroethyl-2,2,3,3-tetrafluoropropyl ether (TFETFPE) (volume ratio 1:1) and LiPF$_6$ dissolved in the mixed solvent, and there was used a separator formed of polypropylene (PP) (Hipore™ manufactured by Asahi Kasei Chemicals Corporation, thickness 20 μm).

Comparative Example 5

A comparative battery 5 was obtained in the same manner as for the battery 1 except that there was used a non-aqueous electrolyte "e" containing a mixed solvent composed of ethylene carbonate (EC) and ethyl methyl carbonate (EMC) (volume ratio 1:1) and $LiPF_6$ dissolved in the mixed solvent.

[Evaluation]

(a) Measurement of the Amount of the Metal Deposited on the Negative Electrode after Storage Each of the batteries 1 to 28 and the comparative batteries 1 to 5, fabricated as described above, was charged at a constant voltage of 4.3 V. Each of these batteries after charge was stored at 85° C. for 72 hours.

On completion of the storage, each of these batteries was disassembled, and the central portion of the negative electrode plate was cut out to obtain a piece of 2 cm×2 cm, and the piece was washed three times with ethyl methyl carbonate. An acid was added to the piece and the piece was dissolved by heating; the undissolved matter was filtered out from the solution thus obtained, and the filtrate thus obtained was adjusted to have a predetermined volume to prepare a measurement sample.

Each of the measurement samples thus prepared was subjected to the quantitative measurement of the amount of the metal (in this case, the amount of Co) eluted from the positive electrode to be deposited on the negative electrode with an ICP emission spectrometer (VISTA-RL, manufactured by Varian, Inc.). The results thus obtained are shown in Table 1. In Table 1, each of the amounts of the deposited metal (metal deposition amounts) is given in terms of the amount per unit weight of the negative electrode.

(b) Capacity Recovery Rate

At the beginning, each of the batteries was subjected to the constant current-constant voltage charge in which the battery was charged at 20° C. at a constant current of 1050 mA until the battery voltage reached 4.3 V and then the battery was charged at a constant voltage of 4.3 V for 2 hours and 30 minutes. Then, each of the batteries after charge was discharged at a discharge current value of 1500 mA (1 C) until the battery voltage was decreased to 3.0 V to evaluate the discharge capacity before storage.

Thereafter, each of the batteries after discharge was charged in the above-described manner, and the batteries after charge were stored at 85° C. for 72 hours.

Each of the batteries after storage was discharged at 20° C., first at a current value of 1 C, and then further discharged at a current value of 0.2 C. Then, each of the batteries after discharge was charged at a constant voltage of 4.3 V for 2 hours and 30 minutes. Each of the batteries after charge was discharged at a current value of 1 C until the battery voltage was decreased to 3.0 V, and the discharge capacity thus obtained was defined as the recovery capacity after storage.

The ratio of the recovery capacity after storage to the discharge capacity before storage was derived in terms of percentage, and such value was defined as the capacity recovery rate after storage. The results thus obtained are shown in Table 1. In Table 1, the types of the used non-aqueous solvents and the types of the used separators are also shown.

TABLE 1

|  | Non-aqueous solvent (volume ratio) | Separator | Metal deposition amount after storage (μg/g) | Capacity recovery rate after storage (%) |
|---|---|---|---|---|
| Battery 1 | SL | PTFE | 8.6 | 84.5 |
| Battery 2 | 3MeSL | PTFE | 8.7 | 84.3 |
| Battery 3 | EMS | PTFE | 8.8 | 84.1 |
| Battery 4 | SL:EMS (1:1) | PTFE | 8.6 | 84.4 |
| Battery 5 | SL:TFETFPE (1:1) | PTFE | 8.3 | 84.7 |
| Battery 6 | SL:TFPDFME (1:1) | PTFE | 8.7 | 84.3 |
| Battery 7 | SL:DMC (1:1) | PTFE | 9.3 | 83.2 |
| Battery 8 | SL:EMC (1:1) | PTFE | 9.1 | 83.5 |
| Battery 9 | SL:DEC (1:1) | PTFE | 9.0 | 83.6 |
| Battery 10 | EC:SL (1:1) | PTFE | 9.0 | 83.7 |
| Battery 11 | EC:3MeSL (1:1) | PTFE | 9.0 | 83.6 |
| Battery 12 | EC:EMS (1:1) | PTFE | 9.0 | 83.8 |
| Battery 13 | EC:AN (1:1) | PTFE | 9.0 | 83.7 |
| Battery 14 | EC:PN (1:1) | PTFE | 9.1 | 83.5 |
| Battery 15 | EC:BN (1:1) | PTFE | 9.1 | 83.3 |
| Battery 16 | EC:TFETFPE (1:1) | PTFE | 9.0 | 83.7 |
| Battery 17 | EC:TFPDFME (1:1) | PTFE | 9.0 | 83.6 |
| Battery 18 | EC:MDFA (1:1) | PTFE | 11 | 82.5 |
| Battery 19 | EC:EDFA (1:1) | PTFE | 11 | 82.7 |
| Battery 20 | EC:ETFEC (1:1) | PTFE | 11 | 82.8 |
| Battery 21 | EC:DTFEC (1:1) | PTFE | 11 | 82.6 |
| Battery 22 | EC:MA (1:1) | PTFE | 13 | 81.0 |
| Battery 23 | EC:MP (1:1) | PTFE | 13 | 81.2 |
| Battery 24 | EC:GBL (1:1) | PTFE | 13 | 80.9 |
| Battery 25 | EC:GVL (1:1) | PTFE | 13 | 81.3 |
| Battery 26 | EC:DMK (1:1) | PTFE | 14 | 80.1 |
| Battery 27 | EC:EMK (1:1) | PTFE | 14 | 80.2 |
| Battery 28 | EC:CHK (1:1) | PTFE | 14 | 80.1 |
| Com. Battery 1 | EC:EMC (1:4) | PE | 75 | 38.1 |
| Com. Battery 2 | SL:EMS (1:1) | PE | 65 | 41.0 |
| Com. Battery 3 | EC:AN (1:1) | PE | 69 | 42.1 |
| Com. Battery 4 | EC:TFETFPE (1:1) | PE | 68 | 42.0 |
| Com. Battery 5 | EC:EMC (1:4) | PTFE | 70 | 40.6 |

As can be seen from Table 1, when the nonaqueous solvent contained a first solvent having an electron-withdrawing substituent and there was used a separator formed of polytetrafluoroethylene having an electron-withdrawing substituent, there were able to obtain batteries reduced in the metal deposition amount after storage and satisfactory in the capacity recovery rate after storage. This is conceivably because the fluorine atoms high in electron density in the separator attracted the atoms low in electron density (atoms each adjacent to the electron-withdrawing substituent) in the first solvent molecules so that the first solvent molecules were adsorbed on the separator, and concomitantly, the electron-withdrawing substituents high in electron density in the first solvent molecules trapped the metal cations eluted from the positive electrode.

As can also be seen, the batteries 1 to 21 each containing a sulfonic solvent, a nitrile solvent or a fluorine-containing solvent are small in the metal deposition amount after storage and high in the capacity recovery rate after storage, as compared to the other batteries. The first solvent contained in each of these batteries has a substituent particularly high in electron-withdrawing property. Consequently, it is conceivable that the amount of the first solvent adsorbed on the separator was increased to further facilitate the trapping of the metal cations.

Among the batteries containing a fluorine-containing solvent, those batteries containing a fluorine-containing ether solvent were small in the metal deposition amount and high in the capacity recovery rate. This is conceivably because in a fluorine-containing ether solvent, the electron density is high on the O atom of the ether bond as well as on the F atom, so that in the fluorine-containing ether solvent, the O atom of the ether bond as well as the F atom contributed to the trapping of the metal cations eluted from the positive electrode.

Example 2

Batteries 29 to 51 were obtained in the same manner as for the battery 5 except that the separators made of the materials as shown in Table 2 were used. In the same manner as described above, for each of the batteries 29 to 51, the metal deposition amount after storage and the capacity recovery rate after storage were evaluated. The results thus obtained are shown in Table 2. In Table 2, the results for the battery 5 are also shown.

In Table 2, the abbreviations for the materials of the used separators are as follows:

| | |
|---|---|
| PFA: | Tetrafluoroethylene-perfluoroalkyl vinyl ether copolymer |
| FEP: | Tetrafluoroethylene-hexafluoropropylene copolymer |
| ETFE: | Tetrafluoroethylene-ethylene copolymer |
| PVDF: | Polyvinylidene fluoride |
| PCTFE: | Polychlorotrifluoroethylene |
| PA: | Polyamide |
| PI: | Polyimide |
| PAI: | Polyamideimide |
| PEI: | Polyetherimide |
| PAR: | Polyarylate |
| PSF: | Polysulfone |
| PES: | Polyethersulfone |
| PPS: | Polyphenylenesulfide |
| PEEK: | Polyetheretherketone |
| PET: | Polyethylene terephthalate |
| PBT: | Polybutylene terephthalate |
| PPE: | Polyphenylene ether |
| POM: | Polyoxymethylene |
| PS: | Polystyrene |
| ASA: | Acrylonitrile-styrene-acrylate copolymer |
| PAN-containing insulating layer: | Insulating layer composed of a polymer containing acrylonitrile units (PAN) and alumina |
| PVDF-containing insulating layer: | Insulating layer composed of polyvinylidene fluoride (PVDF) and alumina |
| PES-containing insulating layer: | Insulating layer composed of polyether sulfone (PES) and alumina |

As the separator formed of polyimide, a polyimide porous film (Upilex-PT™, manufactured by UBE INDUSTRIES, LTD.) was used.

The other separators were prepared as described above.

Each of the various polymers was dissolved in a predetermined organic solvent to prepare a polymer solution. The solution was extruded from the die of an extruder into a sheet. The extruded sheet was cooled until the sheet reached 90° C. or lower at a cooling rate of 50° C./minute, to prepare a gelatinous composition.

Next, the gelatinous composition was subjected to biaxial stretching at a predetermined magnification to prepare a molded matter. Then, the molded matter thus obtained was cleaned with a cleaning agent until the amount of the remaining solvent in the molded matter became less than 1% by weight of the molded matter. The cleaning agent was appropriately varied according to the type of the used solvent. Thereafter, the molded matter was dried to remove the cleaning agent.

Finally, the molded matter after drying was subjected to heat setting at a temperature of 100° C. or higher, to prepare a separator.

When the separators were formed of the above-mentioned insulating layers, the insulating layers were formed on the negative electrode.

The above-mentioned PAN-containing insulating layer, PVDF-containing insulating layer and PES-containing insulating layer were prepared according to the following procedures.

The following were kneaded with a double arm kneader to prepare a paste: 970 g of alumina having a median size of 0.3 µm, 375 g of a polyacrylonitrile-modified rubber binder (BM-720H manufactured by Zeon Corporation (solid content 8% by weight)), and an appropriate amount of N-methyl-2-pyrrolidone. The paste was applied to both of the negative electrode active material layers with a thickness of 20 µm, dried, then further dried under a vacuum reduced pressure at 120° C. for 10 hours to form insulating layers composed of alumina and a polymer containing acrylonitrile units.

An insulating layer composed of polyvinylidene fluoride and alumina and another insulating layer composed of polyethersulfone and alumina were prepared in the same manner as described above except that the polyvinylidene fluoride (solid content 8% by weight) and polyethersulfone (solid content 8% by weight) were respectively used in place of the polyacrylonitrile-modified rubber binder.

The thickness of each of the used separators was approximately 50 µm.

TABLE 2

| | Separator | Metal deposition amount after storage (µg/g) | Capacity recovery rate after storage (%) |
|---|---|---|---|
| Battery 5 | PTFE | 8.3 | 84.7 |
| Battery 29 | PFA | 11 | 82.6 |
| Battery 30 | FEP | 11 | 82.7 |
| Battery 31 | ETFE | 11 | 82.5 |
| Battery 32 | PVDF | 11 | 82.5 |
| Battery 33 | PCTFE | 10 | 82.3 |
| Battery 34 | PA | 15 | 80.3 |
| Battery 35 | PI | 14 | 80.6 |
| Battery 36 | PAI | 15 | 80.2 |
| Battery 37 | PEI | 16 | 80.0 |
| Battery 38 | PAR | 16 | 80.1 |
| Battery 39 | PSF | 12 | 81.6 |
| Battery 40 | PES | 13 | 81.3 |
| Battery 41 | PPS | 12 | 81.4 |
| Battery 42 | PEEK | 13 | 81.0 |
| Battery 43 | PET | 13 | 81.1 |
| Battery 44 | PBT | 12 | 81.5 |
| Battery 45 | PPE | 14 | 80.9 |
| Battery 46 | POM | 14 | 80.8 |
| Battery 47 | PS | 15 | 80.3 |
| Battery 48 | ASA | 14 | 80.7 |
| Battery 49 | PAN-containing insulating layer | 8.1 | 84.3 |
| Battery 50 | PVDF-containing insulating layer | 8.8 | 83.1 |
| Battery 51 | PES-containing insulating layer | 9.5 | 82.7 |

As can be seen from Table 2, even when the type of the electron-withdrawing substituent or the type of the atom having an unshared electron pair contained in the material constituting the separator was varied, there were able to be obtained batteries in which the amount of the metal deposited on the negative electrode after storage was decreased and the capacity recovery rate after storage was satisfactory.

Among such batteries, the batteries 5 and 29 to 33 including a separator formed of a material containing fluorine atoms in the composition thereof were small in the metal deposition amount and were improved in the capacity recovery rate. This is conceivably because the strong electron-withdrawing property of the fluorine atom enhanced the interaction between the separator and the atoms low in electron density in the first solvent, so as to increase the number of the metal cation-trapping sites in the separator.

Among the batteries including a separator containing fluorine atoms in the composition thereof, the battery 5 including a separator formed of PTFE was smaller in the metal deposition amount and exhibited a higher value for the capacity recovery rate as compared with the other batteries. PTFE contains, in each of the repeating units thereof, four fluorine atoms strong in electron-withdrawing property. It is conceivable that the interaction between PTFE and the first solvent was thereby more enhanced to improve the metal cation-trapping effect due to the first solvent.

The batteries 49 to 51, using as the separator an insulating layer including a material containing an electron-withdrawing substituent or an atom having an unshared electron pair and an inorganic filler, each were small in the metal deposition amount and exhibited a high capacity recovery rate value. This is conceivably because such insulating layers included an inorganic filler, and were thereby strong in resistance to reduction, and hence the electron transfer from the negative electrode to the low-electron-density portion of the separator was suppressed.

When the polymer containing acrylonitrile units was included in the insulating layer, the battery storage properties were particularly excellent. This is conceivably because the dispersibility between the polymer containing acrylonitrile units and the inorganic filler was excellent in the insulating layer so as to enhance the metal cation-trapping effect.

Example 3

Batteries 52 and 53 were obtained in the same manner as for the battery 5 except that a polyethylene (PE) film that is a film resistant to reduction (Hipore™ manufactured by Asahi Kasei Chemicals Corporation, thickness 20 μm) and a polypropylene (PP) film that is a film resistant to reduction (Hipore™ manufactured by Asahi Kasei Chemicals Corporation, thickness 20 μm) were respectively laminated on the separator formed of PTFE. In the battery 52, the PTFE film was disposed on the side facing the positive electrode and the PE film was disposed on the side facing the negative electrode. Also, in the battery 53, the PTFE film was disposed on the side facing the positive electrode and the PP film was disposed on the side facing the negative electrode.

In the same manner as described above, for each of the batteries 52 and 53, the metal deposition amount after storage and the capacity recovery rate after storage were evaluated. The results thus obtained are shown in Table 3. In Table 3, the results for the battery 5 are also shown.

TABLE 3

| | Separators | | Metal deposition amount after storage (μg/g) | Capacity recovery rate after storage (%) |
| | Side facing negative electrode | Side facing positive electrode | | |
| --- | --- | --- | --- | --- |
| Battery 5 | PTFE | PTFE | 8.3 | 84.7 |
| Battery 52 | PE | PTFE | 5.1 | 89.0 |
| Battery 53 | PP | PTFE | 5.8 | 88.2 |

As compared to the results for the battery 5, in each of the battery 52 with a PE film interposed between the separator and the negative electrode and the battery 53 with a PP film interposed between the separator and the negative electrode, the metal deposition amount after storage was remarkably decreased, and the capacity recovery rate after storage exhibited an extremely excellent value. The disposition of the PE or PP film strongly resistant to reduction on the separator side facing the negative electrode suppresses the electron transfer from the negative electrode to the PTFE separator. It is conceivable that the strong interaction between the PTFE separator adjacent to the positive electrode and the atoms, low in electron density, in the first solvent molecules was able to be maintained, and the metal cation-trapping effect was thereby further enhanced.

Example 4

A battery 54 was obtained in the same manner as for the battery 5 except that an insulating layer was formed on the negative electrode. For the battery 54, the metal deposition amount after storage and the capacity recovery rate after storage were evaluated in the same manner as described above. The results thus obtained are shown in Table 4. In Table 4, the results for the battery 5 are also shown.

In the battery 54, as the insulating layer formed on the negative electrode, the PAN-containing insulating layer of Example 2 was used. In the battery 54, the PAN-containing insulating layer was prepared in the same manner as in Example 2 except that the thickness of the PAN-containing insulating layer was set at 5 μm.

TABLE 4

| | Insulating layer | Metal deposition amount after storage (μg/g) | Capacity recovery rate after storage (%) |
| --- | --- | --- | --- |
| Battery 5 | None | 8.3 | 84.7 |
| Battery 54 | Formed | 6.5 | 86.1 |

As compared to the results for the battery 5, in the battery 54 with an insulating layer further formed on the negative electrode, the metal deposition amount after storage was remarkably decreased, and the capacity recovery rate after storage exhibited an extremely satisfactory value. The insulating layer serves to suppress the electron transfer from the negative electrode to the low-electron-density portion of the separator, and the electron-withdrawing effect of the fluorine atoms in the PTFE separator is thereby prevented from being weakened. It is conceivable that the strong interaction between the PTFE separator and the atoms, low in electron density, in the first solvent molecules was able to be maintained, and the metal cation-trapping effect was thereby further enhanced.

Example 5

A battery 55 was obtained in the same manner as for the battery 8 except that Li[Ni$_{1/2}$Mn$_{3/2}$]O$_4$ was used as the positive electrode active material.

Comparative Example 6

A comparative battery 6 was obtained in the same manner as for the battery 55 except that there was used a non-aqueous electrolyte "f" containing a mixed solvent composed of ethylene carbonate (EC) and ethyl methyl carbonate (EMC) (volume ratio 1:1) and LiPF$_6$ dissolved in the mixed solvent, and there was used a separator formed of polyethylene (PE) (Hipore™ manufactured by Asahi Kasei Chemicals Corporation, thickness 20 μm).

Comparative Example 7

A comparative battery 7 was obtained in the same manner as for the battery 55 except that there was used a separator formed of polyethylene (PE) (Hipore™ manufactured by Asahi Kasei Chemicals Corporation, thickness 20 μm).

Comparative Example 8

A comparative battery 8 was obtained in the same manner as for the battery 55 except that there was used a non-aqueous electrolyte "g" containing a mixed solvent composed of ethylene carbonate (EC) and ethyl methyl carbonate (EMC) (volume ratio 1:1) and $LiPF_6$ dissolved in the mixed solvent.

For each of the battery 55 and the comparative batteries 6 to 8, the metal deposition amount after storage and the capacity recovery rate after storage were evaluated in the same manner as described above. The results thus obtained are shown in Table 5. In Table 5, the used non-aqueous solvents, separators and positive electrode active materials are also shown.

It is to be noted that the positive electrode active material $Li[Ni_{1/2}Mn_{3/2}]O_4$ has a discharge voltage as high as 4.6 V to 4.8 V relative to lithium metal. Accordingly, the upper limit of the voltage in charge was set at 4.9 V. In the measurement (ICP emission spectrometry) of the amount of the metal deposited on the negative electrode, the amount of Ni and the amount of Mn were quantitatively determined, and the total amount thereof was defined as the metal deposition amount after storage.

TABLE 5

|  | Non-aqueous solvent (volume ratio) | Separator | Positive electrode active material | Metal deposition amount after storage (μg/g) | Capacity recovery rate after storage (%) |
|---|---|---|---|---|---|
| Battery 55 | SL:EMC (1:1) | PTFE | $Li[Ni_{1/2}Mn_{3/2}]O_4$ | 13 | 81.1 |
| Comparative Battery 6 | EC:EMC (1:1) | PE | $Li[Ni_{1/2}Mn_{3/2}]O_4$ | 116 | 20.5 |
| Comparative Battery 7 | SL:EMC (1:1) | PE | $Li[Ni_{1/2}Mn_{3/2}]O_4$ | 110 | 21.3 |
| Comparative Battery 8 | EC:EMC (1:1) | PTFE | $Li[Ni_{1/2}Mn_{3/2}]O_4$ | 102 | 23.6 |

As can be seen from Table 5, the battery 55 was remarkably smaller in the metal deposition amount after storage and was found to exhibit a remarkably improved capacity recovery rate after storage, as compared to the comparative batteries 6 to 8. Accordingly, it can be seen that even when $Li[Ni_{1/2}Mn_{3/2}]O_4$ was used as the positive electrode active material, if the non-aqueous electrolyte includes a first solvent having an electron-withdrawing substituent and a separator including a material containing an electron-withdrawing substituent or an atom having an unshared electron pair is used, there can be obtained a battery small in the metal deposition amount after storage and satisfactory in the capacity recovery rate after storage.

According to the present invention, the degradation of the rate characteristics after storage, in particular, after storage at high voltages and at high temperatures can be avoided. Consequently, according to the present invention, a non-aqueous electrolyte secondary battery excellent in storage characteristics can be provided.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising:
    a positive electrode comprising a lithium-containing transition metal oxide as a positive electrode active material;
    a negative electrode;
    a separator and a reduction-resistant film interposed between said positive electrode and said negative electrode; and
    a non-aqueous electrolyte, wherein:
    said non-aqueous electrolyte comprises a non-aqueous solvent and a solute dissolved in said non-aqueous solvent,
    said non-aqueous solvent
    consisting essentially of 1,1,2,2-tetrafluoroethyl-2,2,3,3-tetrafluoropropyl ether and sulfolane,
    said separator has a thickness of 54 to 300 μm and is in contact with said positive electrode,
    said reduction-resistant film is in contact with said negative electrode,
    said separator comprises polytetrafluoroethylene, and
    said reduction-resistant film comprises at least one of polyethylene film and polypropylene film.

2. The non-aqueous electrolyte secondary battery according to claim 1, wherein said separator further comprises an inorganic filler.

3. The non-aqueous electrolyte secondary battery according to claim 1, wherein said separator is a microporous film of said at least one material.

4. The non-aqueous electrolyte secondary battery according to claim 1, wherein said positive electrode contains $Li[Ni_{1/2}Mn_{3/2}]O_4$.

* * * * *